US 9,415,529 B2

(12) United States Patent
Stephan et al.

(10) Patent No.: US 9,415,529 B2
(45) Date of Patent: Aug. 16, 2016

(54) METHOD FOR OPERATING AN APPARATUS WITH AT LEAST ONE ROTATING SHAFT

(71) Applicant: BASF SE, Ludwigshafen (DE)

(72) Inventors: Oskar Stephan, Hockenheim (DE); Monte Peterson, Perland, TX (US)

(73) Assignee: BASF SE, Ludwigshafen (DE)

( * ) Notice: Subject to any disclaimer, the term of this patent is extended or adjusted under 35 U.S.C. 154(b) by 520 days.

(21) Appl. No.: 13/887,923

(22) Filed: May 6, 2013

(65) Prior Publication Data

US 2013/0301375 A1 Nov. 14, 2013

Related U.S. Application Data

(60) Provisional application No. 61/643,916, filed on May 8, 2012.

(51) Int. Cl.
*B01F 7/02* (2006.01)
*B01F 15/02* (2006.01)
(Continued)

(52) U.S. Cl.
CPC . *B29B 7/007* (2013.01); *B01F 7/02* (2013.01); *B01F 15/0035* (2013.01); *B01F 15/00201* (2013.01); *B01F 15/00818* (2013.01); *B01F 15/0293* (2013.01)

(58) Field of Classification Search
CPC ............. B01F 15/0266; B01F 15/0267; B01F 15/00201; B01F 15/0035; B01F 15/00818; B01F 15/0293; B01F 7/02
USPC ........................................ 366/76.2, 184–196
See application file for complete search history.

(56) References Cited

U.S. PATENT DOCUMENTS 1,500,061 A * 7/1924 Dimm .......................... 366/196
3,472,491 A * 10/1969 Feder .............................. 366/77
3,515,374 A * 6/1970 Curley .......................... 366/193
(Continued)

FOREIGN PATENT DOCUMENTS

DE 3310484 C1 7/1984
EP 1462473 A1 9/2004
(Continued)

OTHER PUBLICATIONS

International Search Report in international patent application No. PCT/EP2013/059435, dated Sep. 5, 2013.
(Continued)

*Primary Examiner* — Tony G Soohoo
(74) *Attorney, Agent, or Firm* — Marshall, Gerstein & Borun LLP

(57) ABSTRACT

A method for operating an apparatus with at least one rotating shaft, the at least one rotating shaft comprising functional elements which act on material to be processed in the apparatus, the apparatus comprising a filling orifice and an outlet orifice with an adjustable lower edge, and material being conveyed continuously through the apparatus from the filling orifice to the outlet orifice, said method comprising the following steps:
  a) measuring load data for the at least one rotating shaft in order to determine shaft load,
  b) lowering the lower edge of the outlet orifice and/or reducing the quantity of material supplied if the shaft load exceeds a specified maximum load, or displacing the lower edge of the outlet orifice upwards and/or increasing the quantity of material supplied if the shaft load is less than a specified shaft load.

5 Claims, 1 Drawing Sheet

(51) Int. Cl.
*B29B 7/00* (2006.01)
*B01F 15/00* (2006.01)

(56) References Cited

U.S. PATENT DOCUMENTS

| | | | | |
|---|---|---|---|---|
| 4,205,919 | A | * | 6/1980 | Attwell ............................ 366/34 |
| 4,550,002 | A | * | 10/1985 | Uhland et al. ................ 264/40.1 |
| 4,931,212 | A | * | 6/1990 | Lemarchand ................. 252/502 |
| 6,109,779 | A | * | 8/2000 | Weinekotter et al. ......... 366/193 |
| 6,987,151 | B2 | | 1/2006 | Gartner et al. |
| 8,070,351 | B2 | | 12/2011 | Stueven et al. |
| 8,591,096 | B2 | * | 11/2013 | Bongratz ....................... 366/142 |
| 9,138,505 | B2 | | 9/2015 | Nogi et al. |
| 2007/0149691 | A1 | | 6/2007 | Ishizaki et al. |
| 2007/0260357 | A1 | | 11/2007 | Issberner et al. |
| 2008/0004408 | A1 | | 1/2008 | Stueven et al. |
| 2012/0091392 | A1 | | 4/2012 | Daniel et al. |
| 2013/0087644 | A1 | * | 4/2013 | Ephraim et al. ................. 241/33 |

FOREIGN PATENT DOCUMENTS

| | | |
|---|---|---|
| EP | 1800740 A2 | 6/2007 |
| GB | 1104827 A | 2/1968 |
| WO | WO-2006/034806 A1 | 4/2006 |
| WO | WO-2006/034853 A1 | 4/2006 |
| WO | WO-2011/024974 A1 | 3/2011 |

OTHER PUBLICATIONS

Intention to Grant, European patent application No. 13724754.0, dated Apr. 11, 2016.

* cited by examiner

METHOD FOR OPERATING AN APPARATUS WITH AT LEAST ONE ROTATING SHAFT

The invention is based on a method for operating an apparatus with at least one rotating shaft, the at least one rotating shaft comprising functional elements which act on material to be processed in the apparatus, the apparatus comprising a filling orifice and an outlet orifice with an adjustable lower edge, and material being conveyed continuously through the apparatus from the filling orifice to the outlet orifice.

Apparatuses with at least one rotating shaft are for example reactors, in particular kneading reactors, kneaders, disk dryers or paddle dryers. Kneading reactors and paddle dryers are used, for example, in the production of poly(meth)acrylates used as superabsorbents. Such kneaders or dryers may, however, also be used in any other desired method.

Depending on the nature of the functional elements mounted on the shaft, for example kneading hooks, paddles or disks, and the product to be treated in the apparatus, forces act on the functional elements. In particular in the case of pulverulent or granular solids or high-viscosity liquids, these forces are comparatively high. This may result in the functional elements being damaged due to excessive forces, which may result in the functional elements breaking off. Broken off functional elements bring about further damage, which may even result in failure of the apparatus.

The forces acting on the functional elements here also depend, in addition to the nature of the material and the nature of the functional elements, on the filling level in the apparatus. The greater is the filling level, the greater are the forces acting on the functional elements. The filling level in the apparatus is generally the result of the rotational speed of the shaft, the quantity of starting materials which are filled into the apparatus and the quantity of starting materials which are discharged from the apparatus. A filling orifice is conventionally provided for addition, said filling orifice for example being arranged above the shaft in the housing of the apparatus. Discharge of the product generally proceeds via a discharge orifice, which may for example take the form of a weir.

A mixing kneader with a rotating shaft with kneading bars introduced thereon as functional elements, with a filling orifice for addition of starting materials and a discharge orifice for discharge of the product is disclosed for example in WO2006/034853. The apparatus disclosed in said document is used for producing poly(meth)acrylates.

A problematic issue with currently used mixing kneaders is that they are conventionally operated with a constant supply of starting material, which in particular in the case of a non-uniform reaction, if a reaction is being carried out in the kneading apparatus, may result in fluctuation of the load on the shaft. Fluctuations in drying in a dryer may correspondingly also result in variation in shaft load.

The object of the present invention is accordingly to provide a method for operating an apparatus with at least one rotating shaft, in which the load on the shaft may be adjusted such that damage to the shaft may be avoided.

Said object is achieved by a method for operating an apparatus with at least one rotating shaft, the at least one rotating shaft comprising functional elements which act on material to be processed in the apparatus, the apparatus comprising a filling orifice and an outlet orifice with an adjustable lower edge, and material being conveyed continuously through the apparatus from the filling orifice to the outlet orifice, said method comprising the following steps:

(a) measuring load data for the at least one rotating shaft in order to determine shaft load, (b) lowering the lower edge of the outlet orifice and/or reducing the quantity of material supplied if the shaft load exceeds a specified maximum load, or displacing the lower edge of the outlet orifice upwards and/or increasing the quantity of material supplied if the shaft load is less than a specified shaft load.

Lowering the lower edge of the outlet orifice if the shaft load exceeds a specified maximum load likewise reduces the maximum filling level in the apparatus, since the material which is present above the lower edge of the outlet orifice in the apparatus is discharged from the apparatus. The same effect is achieved by reducing the quantity of material supplied. The lower filling level results in a lower load on the shaft, such that an excessively high shaft load may be reduced in this way and shaft damage may be avoided or at least reduced. If the load falls below a specified shaft load, it is possible to displace the lower edge of the outlet orifice upwards, whereby the overall filling level is increased. Increasing the filling level may alternatively also be achieved by increasing the quantity of material supplied. In this way, in addition to avoiding shaft damage, it is also in each case possible to set the maximum possible filling level and so achieve the maximum possible throughput through the apparatus.

Lowering or raising the lower edge of the outlet orifice allows the filling level to be set even in the case of a constant rate of addition of material into the apparatus.

In one preferred embodiment, the lower edge of the outlet orifice is formed by a displaceable weir and, in order to lower the lower edge of the outlet orifice, the weir is moved downwards and, in order to displace the lower edge of the outlet orifice upwards, the weir is moved upwards. The outlet orifice equipped with an adjustable weir may here be arranged at an end face of the apparatus or on the side of the apparatus. The outlet orifice is preferably located on the opposite side of the apparatus from the filling orifice in the axial direction.

The housing of the apparatus is conventionally cylindrical so as to be able to ensure functioning. The end faces may here be of flat or curved construction. The shape of the end faces is here also dependent on the pressure level in the apparatus. In the event that the apparatus is operated under pressure, the covers are for example of curved construction.

The weir, with which the outlet orifice is equipped at its lower edge, is here conventionally constructed with the same geometry as the housing surrounding the weir. In the case of a weir mounted on the side of the housing, the weir is for example likewise curved, such that it may be displaced in the interior of the housing or externally on the housing. It is, for example, possible to this end to provide the housing with guide rails in which the weir is displaced. When the weir is positioned on an end face of the apparatus, it is for example possible to construct the weir as a flat plate, if the cover closing the end face likewise forms a flat surface.

In order to prevent material from leaking out of the apparatus from the side of the weir, it is furthermore advantageous for the weir to be sealed relative to the apparatus. Any desired seal which does not obstruct displacement of the weir may be used for this purpose.

If the material treated in the apparatus is of a coarse granular nature, sealing is optionally not required, since the material cannot escape from the apparatus even through narrow gaps. Sealing is in particular not absolutely necessary when solids are treated in the apparatus. If, however, a liquid is being processed in the apparatus, depending on the liquid's viscosity, sealing is essential. In particular in the case of low viscosity liquids, a seal must be provided in order to avoid liquid being able to escape from the apparatus through gaps formed by the weir.

Since the method according to the invention is in particular used with high-viscosity or solid materials, it is generally possible to dispense with sealing of the weir.

Since the load on the shaft is dependent on a large number of parameters, it is necessary to detect the load on the shaft. To this end, load data for the at least one rotating shaft are measured in step (a) in order to determine shaft load. The load data which are measured may, for example, comprise the rotational speed of the shaft, the motor power for driving the shaft and shaft deflection values. It is possible for just one, or also for two or more, of these values to be detected. It is particularly advantageous to detect all three measured values.

In the event of an increase in shaft load, the rotational speed of the shaft for example declines. Due to the greater load on the shaft, i.e. the greater force which must be exerted by the shaft, for example in the event of a higher filling level or also greater crosslinking, for example when producing crosslinked polymers, and thus a higher viscosity, larger forces are transferred onto the functional elements and the shaft is slowed down in this way. If the peripheral speed of the shaft is to be kept constant, drive power must therefore be increased. Drive power may therefore also be recorded in order to determine shaft load. Increased motor power for driving the shaft in order to maintain a constant rotational speed is indicative of a higher shaft load. A higher load on the shaft may additionally also result in increased deflection of the shaft, such that shaft deflection values may also be recorded in order to determine load on the shaft.

If the rotational speed of the shaft is to be detected, any desired speed sensor known to a person skilled in the art is suitable for this purpose. The speed sensor is here preferably mounted on the shaft outside the housing. It is here possible to arrange the speed sensor either on the drive end of the shaft or on the end of the shaft remote from the drive. Arranging the speed sensor outside the housing has the advantage that the speed sensor is in this case not impaired by the material present in the apparatus. In addition to positioning the speed sensor at one of the shaft ends, it is alternatively also possible, in particular when using a hollow shaft, to accommodate the speed sensor in the interior of the shaft. In this case, a shaft feedthrough, through which the speed sensor is introduced into the interior of the shaft, is required. It is, preferred, however to arrange the speed sensor externally on the shaft at one of the shaft ends.

If the motor power for driving the shaft is to be detected, any desired sensor with which motor power may be detected may be used in this case too. It is in particular possible to this end to detect the absorbed power directly on the shaft drive. Motor power may here be recorded and calculated for example by detecting the voltage and current intensity.

If rotational speed is detected, in addition to detecting the rotational speed of the shaft, it is also possible to record the rotational speed of the motor. A speed sensor provided in the motor may, for example, be used for this purpose. If the rotational speed of the shaft decreases, the rotational speed of the motor also declines. The rotational speed of the shaft and motor are directly coupled to one another.

Deflection of the shaft may likewise be detected using any desired sensors known to a person skilled in the art which enable the detection of deflection. Sensors with which a detection of shaft deviation from the axial position at one of the shaft ends is possible may, for example, be used for this purpose.

In order to measure shaft deflection, it is for example possible to use two measurement transducers which are radially offset to one another in order to detect the deflection. It is here particularly preferred to use two measurement transducers which are radially offset to one another by 90°. Using the sensors which are radially offset to one another makes it possible to determine the deviation in two different directions. The overall deviation of the shaft from the axial position may be determined on this basis. If only one measurement transducer is used, it is not possible, in particular, to detect a deviation from an axial position which lies transversely of the measurement direction of the measurement transducer, since the distance between sensor and shaft remains constant in this case.

In an alternative embodiment, the deflection values are determined by determining the distance between the shaft ends and determining the deflection of the shaft on the basis of a change in said distance. In the event of deflection of the shaft, the distance between the shaft ends increases on one side while the distance between the shaft ends decreases on the other side. In this manner, deflection may be determined straightforwardly from the distance between the shaft ends.

A control unit is preferably provided for carrying out the method. The control unit may be any desired computer programmable control unit which is suitable for controlling an apparatus. Such a control unit is, for example, a personal computer.

The control unit is preferably configured such that the load data may be supplied to it. In the control unit, the load data are compared with the specified maximum load and, if the maximum load is exceeded, the control unit causes the lower edge of the outlet orifice to be displaced downwards and/or the quantity of material supplied to be reduced. If the shaft load is below the maximum load, the lower edge of the outlet orifice may be displaced upwards, in order to achieve a maximum possible throughput. It is alternatively also possible here to increase the quantity of material supplied. In order to displace the outlet orifice, the weir defining the outlet orifice may for example be driven with an actuator, for example a servomotor. The control unit transmits appropriate signals to the actuator, which brings about displacement of the lower edge of the outlet orifice in the in each case appropriate direction.

In order to avoid the lower edge of the outlet orifice being incessantly displaced alternately upwards and downwards because the load on the shaft exceeds or falls below the maximum load, it is furthermore advantageous additionally to provide a minimum load, below which the upwards displacement of the lower edge of the outlet orifice is begun. Provided that the load neither exceeds the maximum load nor falls below the minimum load, the lower edge of the outlet orifice may remain in its position. Alternatively, the quantity of material supplied is in this case not changed accordingly.

If only one value is detected for measuring the load data for the at least one rotating shaft, the maximum load or the minimum load is represented by this single value. If, for example, only the rotational speed of the shaft is detected, the maximum load represents the minimum rotational speed of the shaft and the minimum load the maximum rotational speed of the shaft. If the rotational speed falls below the minimum rotational speed of the shaft, the maximum load on the shaft has been reached and the lower edge of the outlet orifice is displaced downwards. If the maximum specified rotational speed is exceeded, the minimum load has been reached and the lower edge of the weir may be displaced upwards again.

Correspondingly, if the motor power for driving the shaft is detected, when a maximum specified motor power is exceeded, the maximum load is exceeded and the lower edge of the outlet orifice must be displaced downwards and/or the quantity of material supplied must be reduced. If the motor power falls below a specified minimum motor power, the lower edge of the outlet orifice is accordingly displaced upwards again and/or the quantity of material supplied is increased, since in this case the load has fallen below the minimum load.

Furthermore, in the event of shaft deflection being detected, a maximum deflection may be specified. If the maximum specified deflection is exceeded, in this case too the maximum load is exceeded, such that the lower edge of the weir is displaced downwards and/or the quantity of material supplied is reduced. In addition, a minimum deflection may be specified, below which the load has fallen below the minimum load on the shaft and in this case the lower edge of the outlet orifice is displaced upwards and/or the quantity of material supplied is increased.

If two or more kinds of load data are detected, it is for example possible to specify separate maximum values and minimum values for each individual kind of load data, for example as mentioned above for shaft deflection, motor power and rotational speed of the shaft, the lower edge of the outlet orifice being displaced as described above in the event of one of the values being exceeded or fallen below, respectively. It is, however, alternatively also possible in this case to combine the measured load data to form a parameter. An algorithm suitable for forming the parameter would in this case need to be ascertained for example by suitable testing.

The parameter is ascertained in such a manner that it represents the shaft load. If the maximum specified shaft load is exceeded, the lower edge of the weir is then displaced downwards again and/or the quantity of material supplied is reduced and if the load falls below a minimum shaft load, the lower edge of the weir is displaced upwards and/or the quantity of material supplied is increased.

In one embodiment of the invention, the maximum load and optionally the minimum load on the shaft are stored in a writable memory means. In this case, the maximum load and optionally the minimum load may be specified by the user of the apparatus and for example set as a function of the method carried out and optionally the desired throughput. Alternatively, it is also possible to specify a fixed level for the maximum load and optionally the minimum load. This is for example possible by storing the maximum load and optionally the minimum load in a non-overwritable memory means. Alternatively, it is also possible to specify the maximum load and optionally the minimum load in this case as fixed values in a computer program for controlling the apparatus.

If the maximum load and optionally the minimum load are user-settable, it is furthermore advantageous to additionally specify a maximum settable level for the maximum value. The maximum settable level is here the maximum load which must not in any event be exceeded. If, for example, the user then specifies a maximum load which is greater than the maximum level, an error message may be output, such that the input may be corrected. Alternatively, it is also possible in this case to fix the maximum load at the respective maximum level. This prevents the user from specifying a maximum load which might result in shaft damage.

In a further embodiment of the invention, in the event of upwards displacement of the lower edge of the outlet orifice, a shaft load is specified, up to which the lower edge of the outlet orifice is displaced upwards and/or the quantity of material supplied is increased, said shaft load being less than the specified maximum load and, where a minimum load is specified, greater than the minimum load. This ensures that the lower edge of the outlet orifice is not displaced upwards until the maximum possible point is reached and/or the maximum quantity of material supplied is set and, on completion of the upwards displacement and/or increase in the quantity of material supplied, the maximum load might already be exceeded, such that it is immediately necessary to displace the lower edge of the outlet orifice back downwards and/or to reduce the quantity of material supplied. The shaft load up to which the lower edge of the weir is displaced upwards may here preferably be specified by the user as a function of the method being carried out. In particular, the maximum filling level of the apparatus and thus the maximum desired throughput may be set in this manner.

The apparatus with at least one rotating shaft which is operated by the method according to the invention is preferably a kneader or a paddle dryer. If the apparatus is a kneader, the latter preferably comprises more than one shaft, for example two shafts. In this case, the shafts have mounted on them kneading bars, for example, which are constructed such that they intermesh. Kneading of the material present in the apparatus may be achieved in this manner. It is here also possible to vary the number of kneading bars on the two rotating shafts and/or to drive the shafts at different speeds.

If the apparatus contains more than one shaft, load data are preferably measured for each of the shafts. In order to avoid shaft damage, the lower edge of the outlet orifice is in this case displaced downwards immediately the shaft load on one shaft exceeds the specified maximum load.

If the apparatus is a paddle dryer, the latter conventionally comprises one rotating shaft. It is, however, possible in this case too for the paddle dryer to contain more than one rotating shaft.

In one particularly preferred embodiment, the apparatus is used for producing poly(meth)acrylates. In this case, the apparatus is for example a mixing kneader, as is used for reacting the starting materials to yield the poly(meth)acrylate. The poly(meth)acrylate produced in the kneading reactor is then dried in the paddle dryer.

The resultant poly(meth)acrylates are used, for example, as superabsorbents in hygiene products.

An exemplary embodiment of the invention is shown in the figures, in which:

FIG. 1 shows a section through an apparatus with an adjustable outlet orifice in the region of the outlet orifice.

Figure 1:
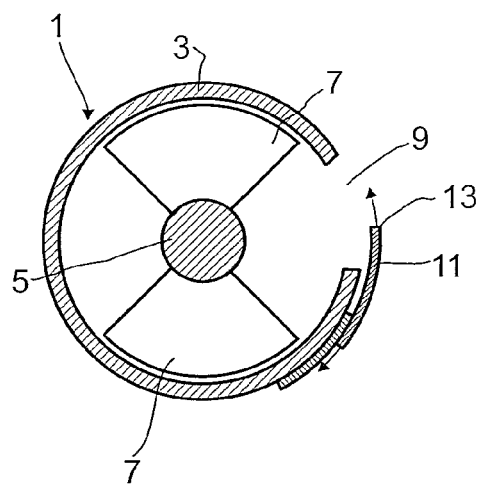
FIG. 1 is a cross-section through an apparatus with a rotating shaft in the region of the outlet orifice.

An apparatus 1 comprises a housing 3, which encloses a shaft 5. Functional elements 7 are mounted on the shaft. The functional elements 7 may for example, as shown in the figure, be paddles of a paddle dryer. It is alternatively also possible for the functional elements for example to be kneading bars or disks. If the functional elements 7 are disks or paddles, they may also be constructed as hollow elements with a temperature control medium flowing through the interior. In this case, the shaft 5 is preferably likewise a hollow shaft, through which a temperature control medium flows.

Material which is present in the apparatus 1 is circulated or thoroughly kneaded with the assistance of the functional elements 7 in the apparatus 1 and simultaneously conveyed from a filling orifice (not shown) to an outlet orifice 9. In the embodiment shown here, the outlet orifice 9 is provided in the side of the housing 3.

In the embodiment shown here, the housing 3 is of cylindrical construction and encloses the shaft 5 with the functional elements 7. The cylindrical design of the housing 3 ensures the best possible functioning of the apparatus 1.

To set the outlet orifice 9, the latter comprises an adjustable weir 11 at its lower edge. The adjustable weir 11 is here adapted to the cylindrical geometry of the housing 3. Any other desired design of the weir 11 which enables displacement of the lower edge 13 of the outlet orifice 9 is, however, also conceivable.

As soon as the shaft load exceeds a specified maximum load, this usually arising at an excessively high filling level, the lower edge 13 of the weir 11 is displaced downwards. This enlarges the outlet orifice 9 at the bottom and the filling level in the apparatus 1 falls. This reduces the load on the shaft. If the shaft load falls below a specified minimum value, it is possible to displace the lower edge 13 of the outlet orifice 9 upwards and so raise the filling level in the apparatus 1. This permits greater throughput and thus maximum utilization of the apparatus 1. Upwards displacement of the lower edge 13 of the outlet orifice 9 should be terminated before the maximum load on the shaft 5 is reached, in order to avoid damaging the shaft 5.

Figure 2:
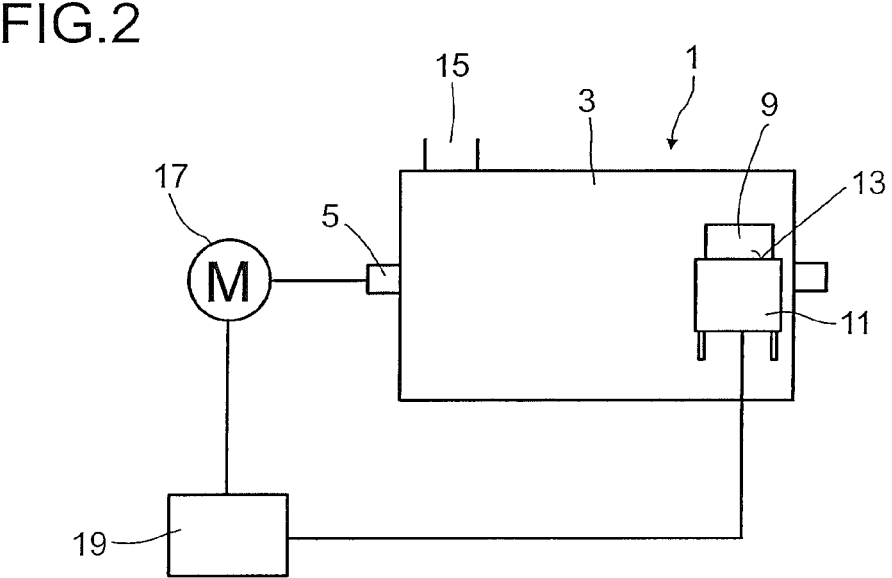
FIG. 2 is a schematic representation in side view of an apparatus with an outlet orifice with displaceable lower edge.

FIG. 2 is a schematic side view of an apparatus with a displaceable outlet orifice.

In addition to the outlet orifice 9, the apparatus 1 also comprises a filling orifice 15. Material to be processed in the apparatus 1 is added via the filling orifice 15. This may, for example, be material to be dried, if the apparatus 1 is a dryer or also starting or other materials which are to be kneaded together in a kneader. If the apparatus is a mixing kneader, as is for example used for producing poly(meth)acrylates, it is the starting materials which react to yield the poly(meth)acrylate which are added via the filling orifice 15. In addition, further filling orifices which are not shown here may be provided, via which additives may for example be added.

In order to be able to operate the apparatus 1, the shaft 5 is provided with a drive 17. The drive 17 is conventionally an electric motor.

Shaft load may be detected by, for example, detecting the rotational speed of the drive 7 or the power of the drive 7. These data are supplied to a control unit 19. In the control unit 19, the detected data are compared with a specified maximum value and optionally a specified minimum value. When the specified maximum value is exceeded, a signal is transmitted to an actuator for the weir 11 and the weir 11 is moved downwards, such that the lower edge 13 of the outlet orifice is moved downwards. Correspondingly, when the value falls below a specified minimum value, the lower edge 13 of the outlet orifice 9 is displaced upwards by displacing the weir 11 upwards. To this end, the control unit 19 for example transmits a signal to an actuator with which the weir 11 may be displaced.

In this manner, it is possible to set the in each case ideal filling level in the apparatus 1 at which shaft damage may still be avoided.

LIST OF REFERENCE SIGNS

1 Apparatus
3 Housing
5 Shaft
7 Functional element
9 Outlet orifice
11 Weir
13 Lower edge
15 Filling orifice
17 Drive
19 Control unit

The invention claimed is:

1. A method for operating an apparatus (1) with at least one rotating shaft (5), the at least one rotating shaft (5) comprising functional elements (7) which act on material to be processed in the apparatus (1), the apparatus (1) comprising a filling orifice (15) and an outlet orifice (9) with an adjustable lower edge (13), and material being conveyed continuously through the apparatus (1) from the filling orifice (15) to the outlet orifice (9), said method comprising the following steps:
   (a) measuring load data for the at least one rotating shaft (5) in order to determine shaft load,
   (b) lowering the lower edge (13) of the outlet orifice (9) and/or reducing a quantity of material supplied through the filling orifice (15) if the shaft load exceeds a specified maximum load, or displacing the lower edge (13) of the outlet orifice (9) upwards and/or increasing the quantity of material supplied through the filling orifice (15) if the shaft load is less than a specified shaft load,
   wherein the load data comprise a rotational speed of the shaft (5), a motor power for driving the shaft (5), and shaft (5) deflection values; and wherein the deflection values are determined by determining a distance between the shaft ends and determining the deflection of the shaft (5) on the basis of a change in said distance.

2. The method as claimed in claim 1, wherein the lower edge (13) of the outlet orifice (9) is formed by a displaceable weir and, in order to lower the lower edge (13) of the outlet orifice (9), the weir (11) is moved downwards and, in order to displace the lower edge (13) of the outlet orifice (9) upwards, the weir (11) is moved upwards.

3. The method as claimed in claim 1, wherein the maximum load and the specified shaft load, up to which the lower edge (13) of the outlet orifice (9) is displaced upwards and/or the quantity of material supplied is increased, is stored in a control unit (19) for adjusting the lower edge (13) of the outlet orifice (9).

4. The method as claimed in claim 1, wherein the apparatus (1) with at least one rotating shaft (5) is a kneader or a paddle dryer.

5. The method as claimed in claim 1, wherein the apparatus (1) is used for producing poly(meth)acrylates.

* * * * *